(12) United States Patent
Paré et al.

(10) Patent No.: US 9,010,781 B2
(45) Date of Patent: Apr. 21, 2015

(54) STEERING KNUCKLE FOR A VEHICLE

(71) Applicant: Soucy International Inc., Drummondville (CA)

(72) Inventors: Steeve Paré, St-Majorique (CA); Steve Fréchette, Drummondville (CA); Serge Latulippe, St-Hyacinthe (CA); William Gasse, Drummondville (CA); André Léger, Drummondville (CA); André Todd, Mont St-Hilaire (CA)

(73) Assignee: Soucy International Inc., Drummondville, Quebec (CA)

( * ) Notice: Subject to any disclaimer, the term of this patent is extended or adjusted under 35 U.S.C. 154(b) by 0 days.

(21) Appl. No.: 13/724,111

(22) Filed: Dec. 21, 2012

(65) Prior Publication Data

US 2013/0161918 A1 Jun. 27, 2013

Related U.S. Application Data

(60) Provisional application No. 61/579,701, filed on Dec. 23, 2011.

(51) Int. Cl.
*B62D 7/18* (2006.01)
*B62D 11/20* (2006.01)
*B62D 55/04* (2006.01)
*B62D 55/065* (2006.01)

(52) U.S. Cl.
CPC *B62D 7/18* (2013.01); *B62D 11/20* (2013.01); *B62D 55/04* (2013.01); *B62D 55/065* (2013.01)

(58) Field of Classification Search
USPC .............. 280/93.512, 86.751, 86.754, 86.758
See application file for complete search history.

(56) References Cited

U.S. PATENT DOCUMENTS

| 7,850,179 B2 * | 12/2010 | Ursu ................ 280/93.512 |
| 8,146,931 B2 * | 4/2012 | Ursu ................ 280/93.512 |
| 8,430,188 B2 * | 4/2013 | Hansen ................ 180/9.26 |
| 2008/0042388 A1 | 2/2008 | McDowell |
| 2010/0139994 A1 | 6/2010 | Hansen |
| 2013/0119628 A1 * | 5/2013 | Deierling et al. ........ 280/93.512 |

FOREIGN PATENT DOCUMENTS

| JP | 2005132255 A | * | 5/2005 |
| WO | 2008073456 | | 6/2008 |

* cited by examiner

*Primary Examiner* — Faye M. Fleming
(74) *Attorney, Agent, or Firm* — Brouillette & Partners; Robert Brouillette

(57) ABSTRACT

A steering knuckle to be used with the steering assembly of a vehicle such as a farming tractor is disclosed. The steering knuckle comprises several preconfigured attachment areas where attachment element(s) or bracket(s) can be releasably yet rigidly secured. The attachment areas may be further reinforced with additional knuckle material (e.g. metal, metallic alloy). The steering knuckle therefore provides predetermined and preconfigured attachment locations where a wheel-replacing track system can be secured, thereby allowing the track system to be mounted to the vehicle while avoiding attachment at inconvenient or weak locations.

21 Claims, 16 Drawing Sheets

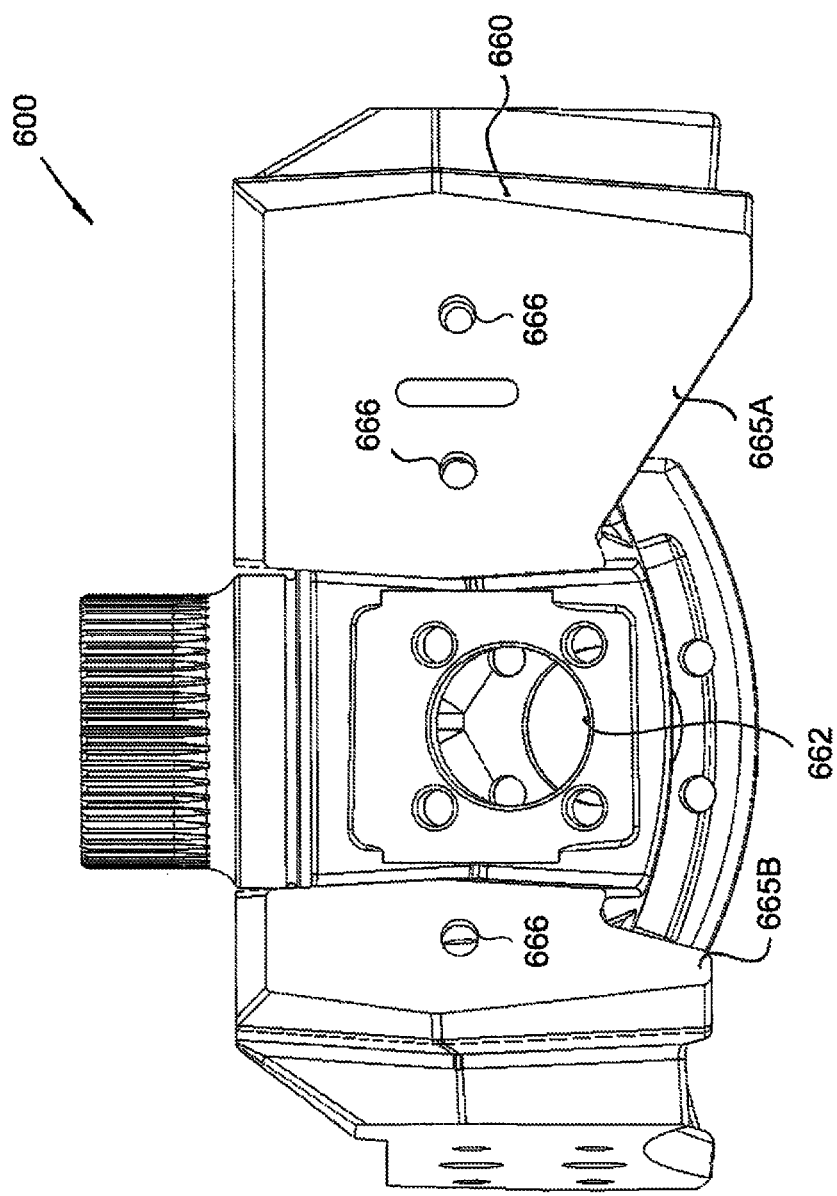

STEERING KNUCKLE FOR A VEHICLE

CROSS-REFERENCE TO RELATED APPLICATIONS

The present patent application claims the benefits of priority of U.S. Provisional Patent Application No. 61/579,701, entitled "Steering Knuckle for a Vehicle" and filed at the United States Patent and Trademark Office on Dec. 23, 2011, the content of which is incorporated herein by reference.

FIELD OF THE INVENTION

The present invention generally relates to steering knuckles (also referred to as steering housings) and more particularly to steering knuckles used with the front axles of heavy vehicles such as, but not limited to, agricultural vehicles, construction vehicles, industrial vehicles, and forestry vehicles.

BACKGROUND OF THE INVENTION

Soil compaction and floatation have always been important issues for farmers operating tractors and other farming vehicles in their fields. It has thus been found advantageous to replace two or even all four wheels of a farming tractor with track systems which use endless traction bands instead of wheels for propulsion.

Using track systems instead of wheels brings several advantages when operated on soft terrains. The larger surface area of the traction bands improves the floatation and reduces soil compaction. The configuration of the track systems also generally improves the overall traction of the tractor.

However, tractors are still typically sold with wheels and are typically configured to be operated with wheels. Hence, when an operator wants to replace the wheels of its tractor with track systems, the track systems must be properly fitted to the model of tractor of the operator. However, as track systems are typically aftermarket products, track system manufacturers must generally manufacture attachment brackets made specifically for each model of tractors, or more generally, for each model of vehicles, to which the track systems can be installed. However, having to manufacture specific attachment brackets for each model of tractors can be quite expensive.

Furthermore, tractors are typically not configured to be equipped with track systems. Hence, mounting track systems to a tractor generally necessitates the attachment of the track systems to the tractor at locations which, in some case, were not initially designed to support and sustain the additional load and strain imparted by the track systems during use.

This is true of track systems installed as replacement of steerable wheels, typically the front wheels, since the track systems need to remain steerable. Hence, the installation generally involves the attachment of the track systems to or near the steering knuckles (e.g. to the wheel hubs, to the bolts holding the kingpin, etc.).

However, as the steering knuckles of a tractor are generally not made nor configured to support track systems, these installations may, in some cases, cause premature wearing of steering components of the tractor or even premature failure of those components. These installations can also cause premature wearing of components of the track systems (i.e. the traction band, road wheels, idler wheels, etc.) due, for instance, to misalignment between the track systems and the vehicle.

Hence, despite the advantages of using track systems on farming tractors and other vehicles, there are still some shortcomings that need to be addressed.

SUMMARY OF THE INVENTION

At least some of the shortcomings of the prior art steering knuckles and steering assemblies regarding the installation of track systems are generally mitigated by a steering knuckle comprising at least one predetermined and preconfigured attachment area configured to releasably yet rigidly received one or more attachment elements which support a track system.

A steering knuckle in accordance with the principles of the present invention generally comprises an inner or interior region which normally faces the vehicle, an outer or exterior region which normally faces away from the vehicle, and a periphery or perimeter which generally comprises a front region, a rear region, an upper or top region and a lower or bottom region.

Understandably, the exact configuration of the steering knuckle is typically dictated by the configuration of the steering assembly, and also possibly by the configuration of the suspension assembly, of the particular vehicle or vehicles to which the steering knuckle is to be installed. In that sense, the inner region may be particularly configured to be properly connected to the steering assembly, and also possibly to the suspension assembly, of the vehicle.

In accordance with the principles of the present invention, the steering knuckle comprises at least one though typically several attachment areas. These attachment areas are typically, though not necessarily, flat, and are typically, though not necessarily, provided with fastener-receiving openings (e.g. threaded bolt bores).

These attachment areas are generally configured to releasably yet rigidly receive one or more attachment elements or brackets used to secure the track system to the steering knuckle. In that sense, the regions of the steering knuckle where the attachment areas are located, or even the whole steering knuckle, may be made bigger and/or thicker, in other words, reinforced, to support the different and/or additional loads transmitted to the attachment areas during use. Other regions of the steering knuckle could also be reinforced if necessary.

A steering knuckle in accordance with the principles of the present invention therefore generally allows a more robust and possibly more convenient installation of a track system to a vehicle since the steering knuckle is physically configured to properly receive the attachment element(s) use to install the track system to the steering knuckle and is physically configured to properly support the load imparted by the track system installed thereto.

Furthermore, by providing predetermined and preconfigured attachment areas, the steering knuckle in accordance with the principles of the present invention avoids the installation of the track system at inconvenient or weak locations on the vehicle, thereby generally preventing premature wearing or even failure at these locations.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other aspects, features and advantages of the invention will become more readily apparent from the following description, reference being made to the accompanying drawings in which:

FIG. 16 is a bottom view of the steering knuckle of FIG. 10.

DETAILED DESCRIPTION OF THE PREFERRED EMBODIMENT

A novel steering knuckle for a vehicle will be described hereinafter. Although the invention is described in terms of specific illustrative embodiments, it is to be understood that the embodiments described herein are by way of example only and that the scope of the invention is not intended to be limited thereby.

Broadly, steering knuckles in accordance with the principles of the present invention can be used on vehicles, such as farming tractors, having either combined steering and suspension assemblies or having rigid axle with steering assembly.

Referring first to FIGS. 1 to 9, a first embodiment of a steering knuckle 100 in accordance with the principles of the present invention is illustrated.

Figure 1:
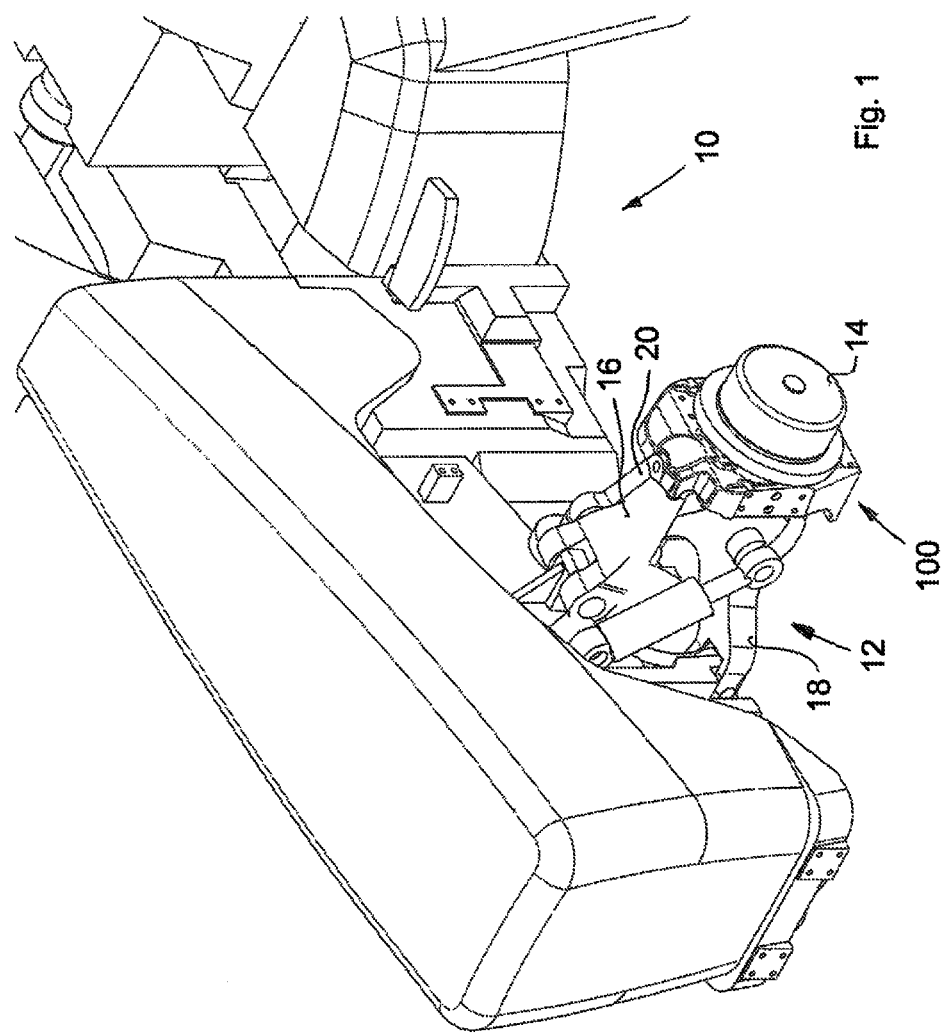
FIG. 1 is a fragmentary left side perspective view of a farming tractor equipped with an embodiment of a steering knuckle in accordance with the principles of the present invention.

Referring now to FIG. 1, the steering knuckle 100 is illustrated as normally installed to the front left steering and suspension assembly 12 of a vehicle 10. In FIG. 1, the vehicle 10 is a farming tractor commonly used on farms. Still, the steering knuckle 100 could be used on other vehicles having similar steering and suspension assembly.

The knuckle 100 is typically coupled to the steering and suspension assembly 12 via ball joints (or other pivotal arrangements). As it will shown in greater details below, the steering knuckle 100 is also configured to receive the drive shaft (not shown) of the vehicle 10 and to support the planetary gear assembly which drives the wheel hub 14 to which the wheel (not shown) of the vehicle 10 is normally mounted.

Though not shown, a right steering knuckle 100, which is substantially a minor image of the left steering knuckle 100 shown in FIG. 1, is also installed on the right side of the vehicle 10. As both the left side and the right side knuckles 100 are substantially identical, aside from being minor images of each other, only the left side knuckle 100 will be described below.

Though the knuckle 100 could be an original component, it is typically a replacement or an aftermarket component used to replace the original knuckle of the vehicle 10. It remains that a vehicle could be initially equipped with knuckles 100 such as to make the vehicle "track ready".

Figure 2:
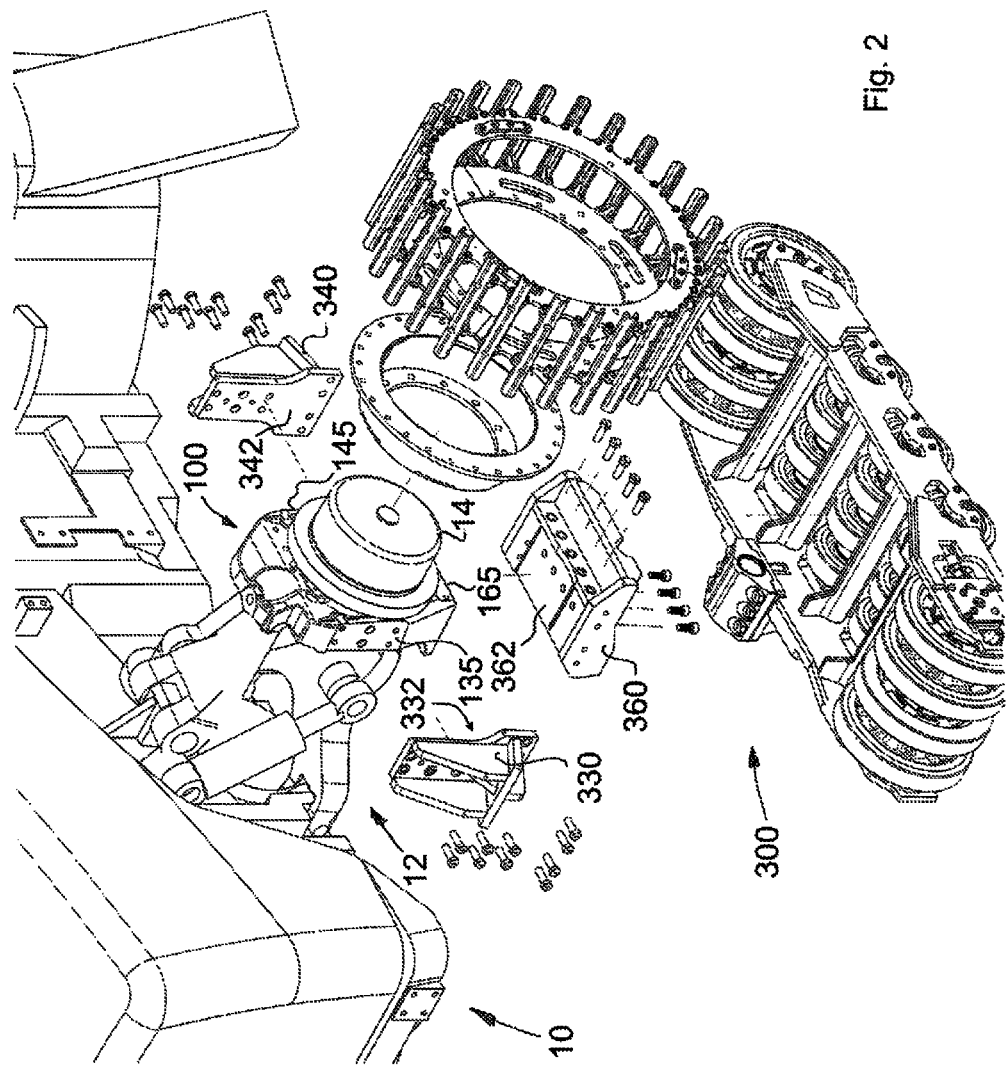
FIG. 2 is a fragmentary left side perspective view of the farming tractor equipped with the steering knuckle of FIG. 1, and further comprising an exploded track system without the endless traction band.

Referring now to FIG. 2 and more particularly to FIGS. 4 to 9, the steering knuckle 100 will be described in more details.

Broadly, the steering knuckle 100 can be seen as comprising an outer side 110 which normally faces away from the vehicle 10, an inner side 120 which normally faces the vehicle 10, and an overall periphery or peripheral surface 105 which generally comprises front and rear regions 130 and 140, and top and bottom regions 150 and 160.

Figure 4:
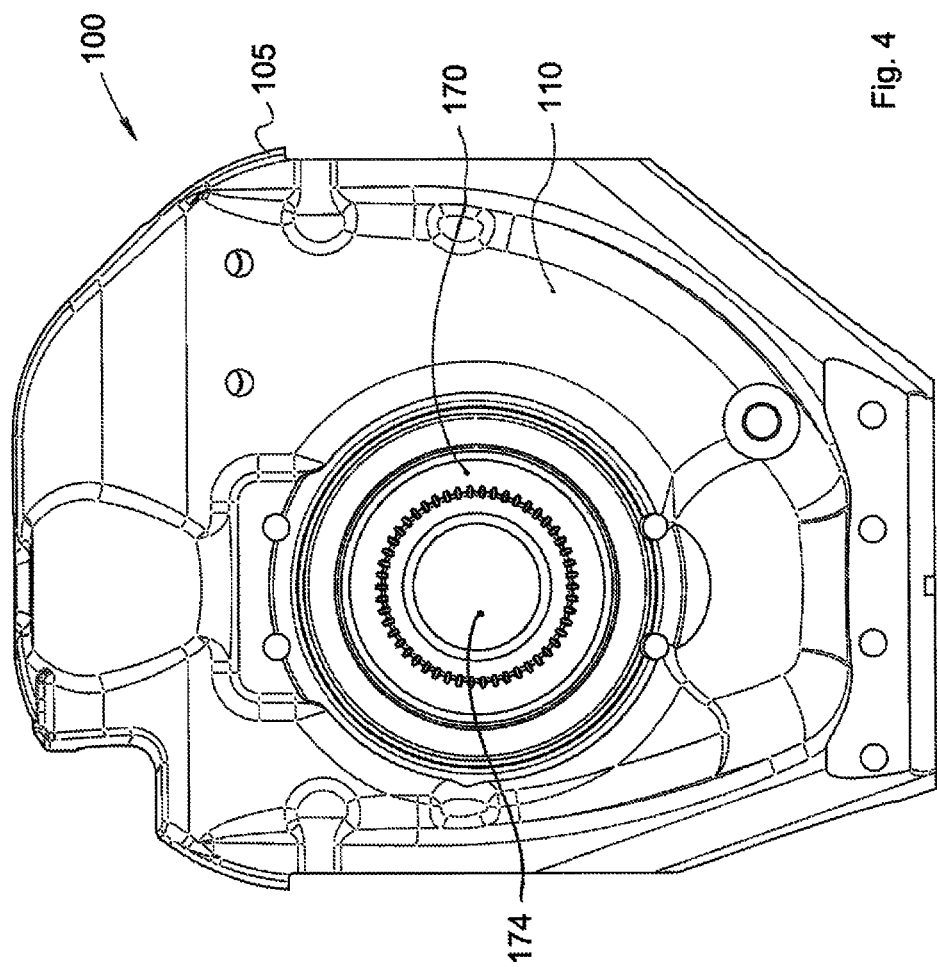
FIG. 4 is an exterior view of the steering knuckle of FIG. 1.

Notably, as can be seen in FIG. 4, the peripheral surface 105 of the steering knuckle 100 is not regular and its exact shape can vary widely according to the vehicle or vehicles for which the steering knuckle is designed for. Hence, the term front, top, rear and bottom used with respect to the regions of the peripheral surface 105 of the steering knuckle 100 must not be construed with geometric exactness.

Figure 5:
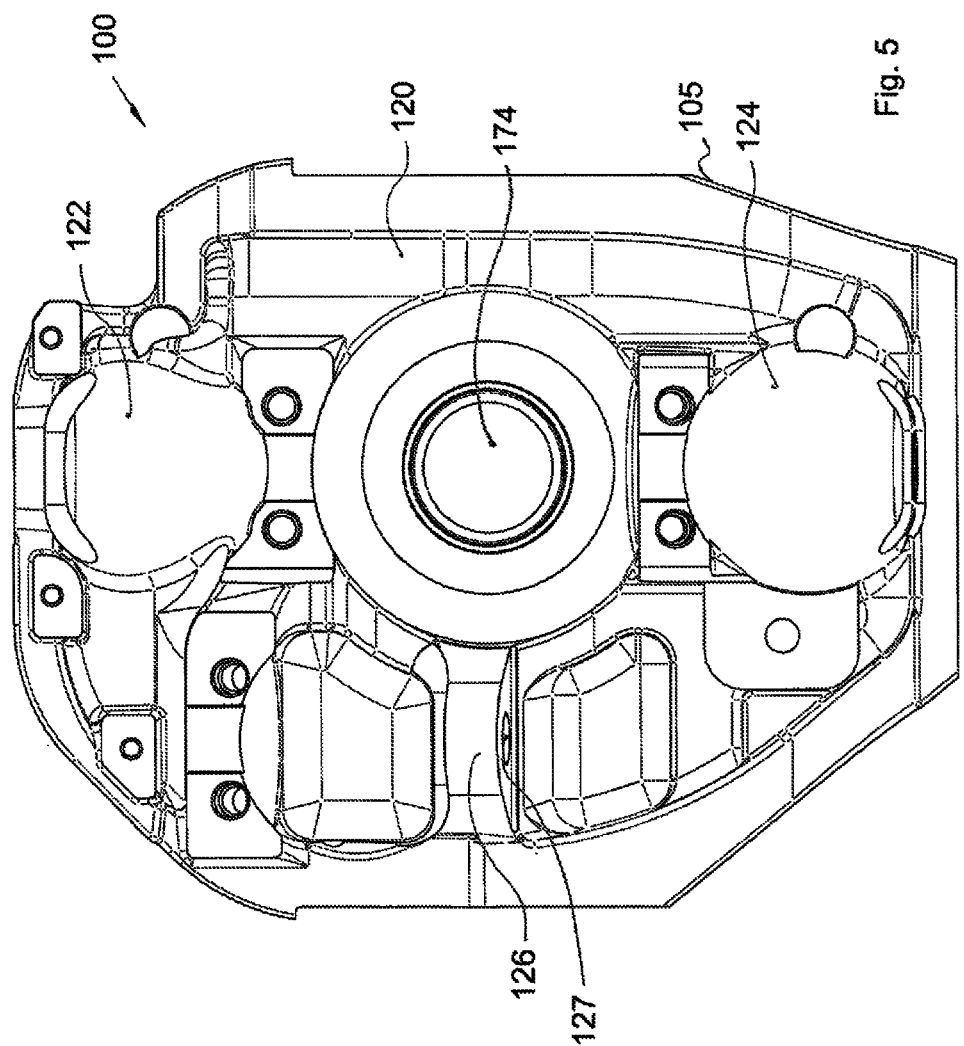
FIG. 5 is an interior view of the steering knuckle of FIG. 1.
Figure 6:
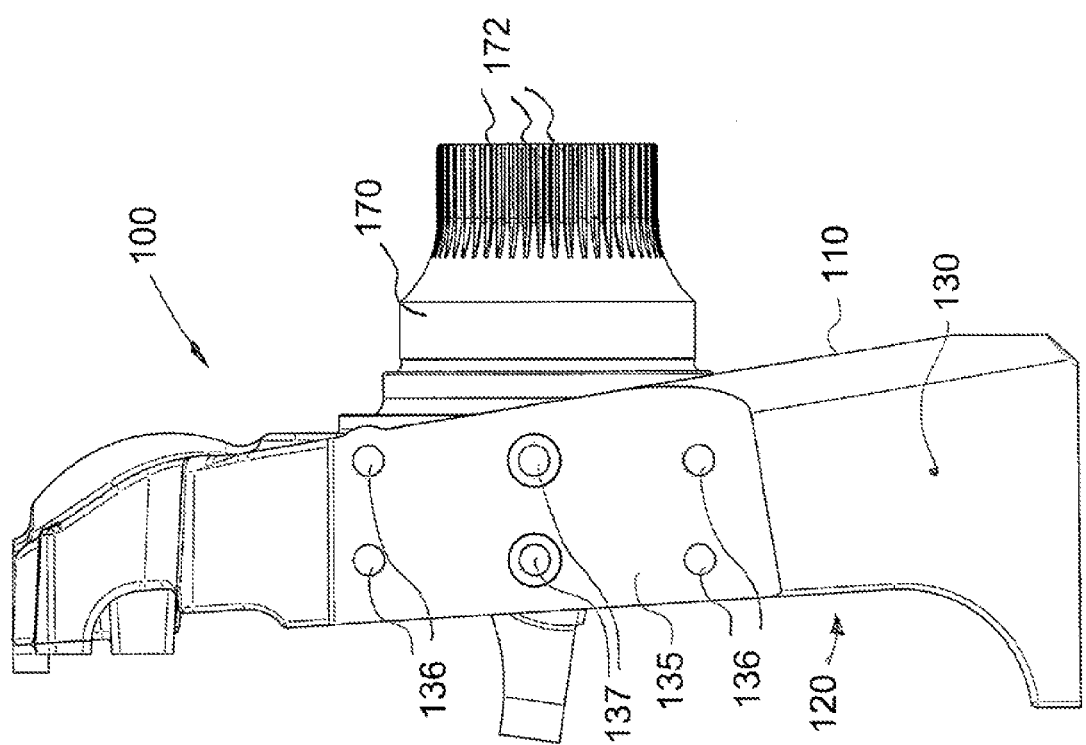
FIG. 6 is a front view of the steering knuckle of FIG. 1.
Figure 7:
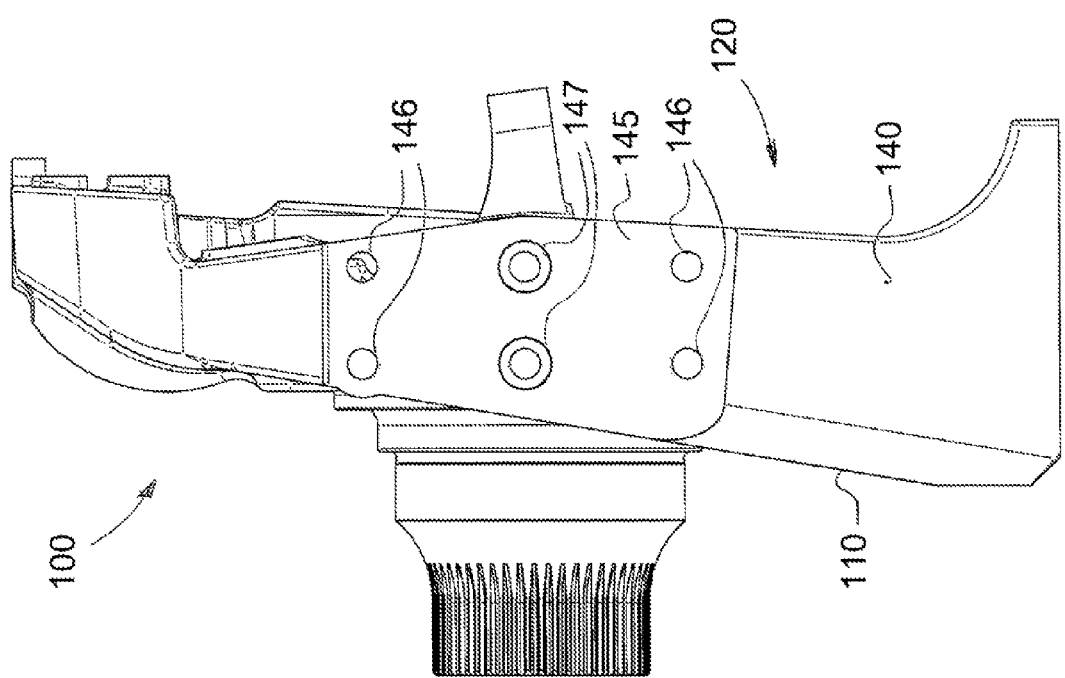
FIG. 7 is a rear view of the steering knuckle of FIG. 1.
Figure 8:
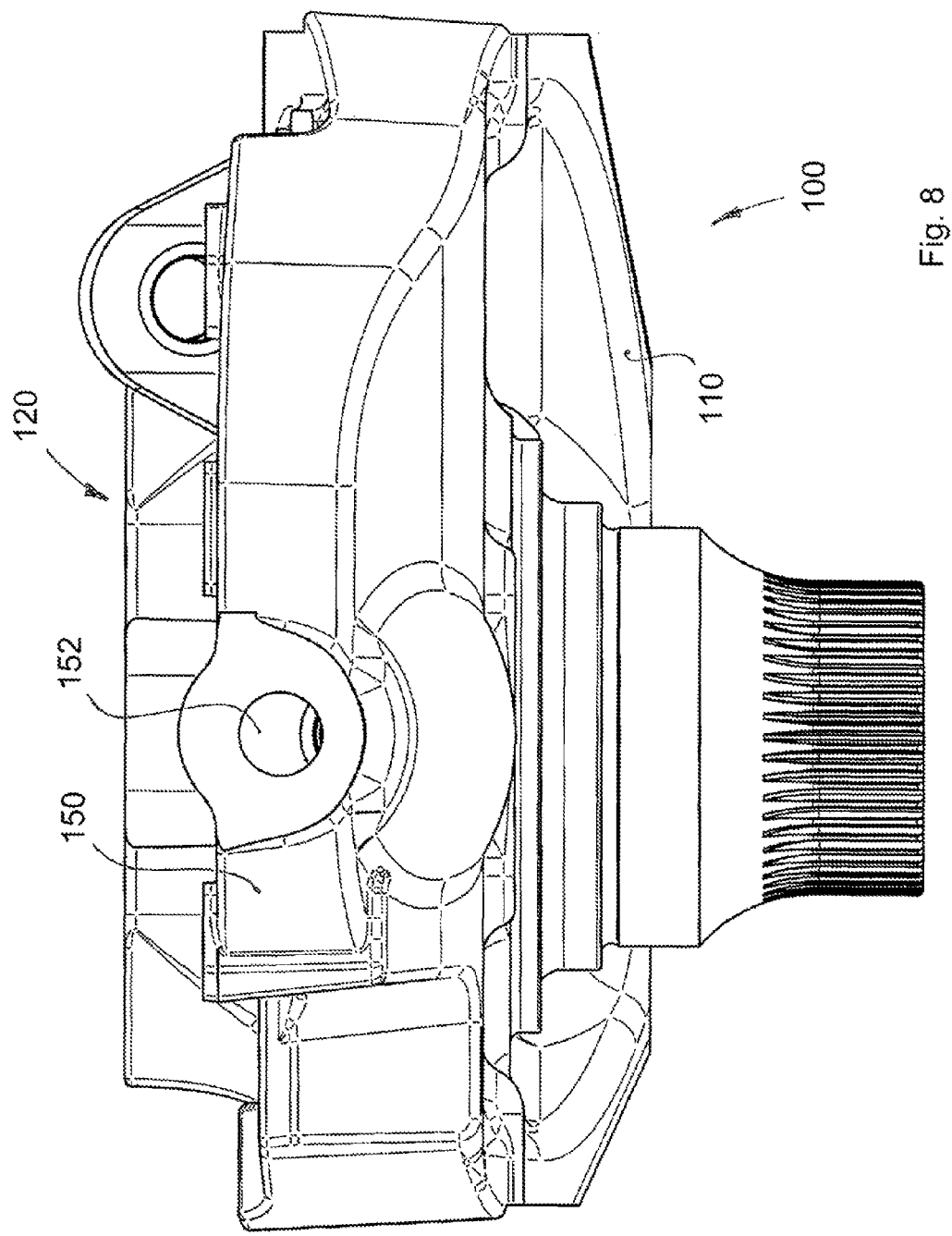
FIG. 8 is a top view of the steering knuckle of FIG. 1.
Figure 9:
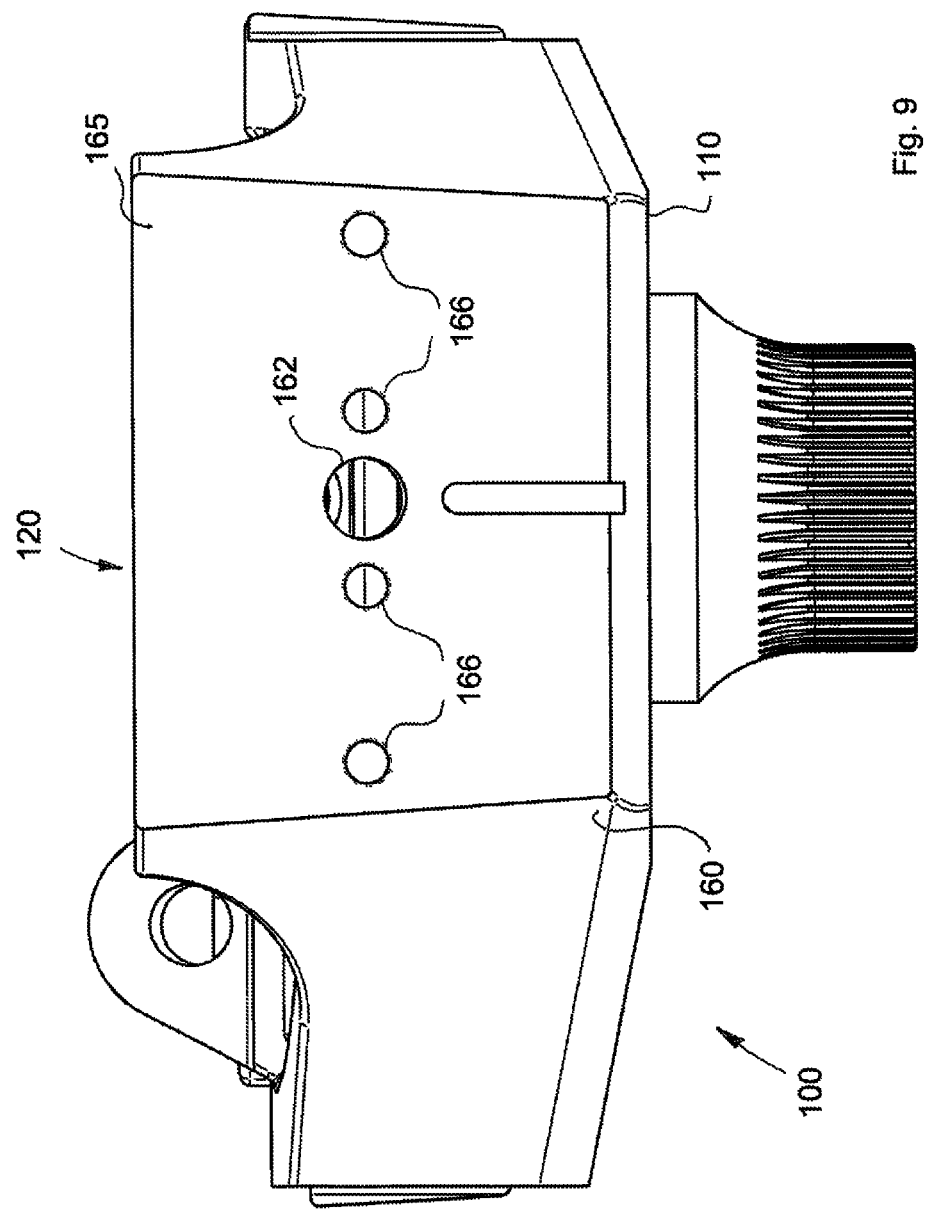
FIG. 9 is a bottom view of the steering knuckle of FIG. 1.

As can be seen in FIGS. 4 and 6, the steering knuckle 100 also comprises a stub 170 outwardly extending from the outer side 110. The stub 170 is configured to support the planetary gear assembly which drives the wheel hub 14 best shown in FIG. 1. To provide proper support between the planetary gear assembly and the stub 170, the circumference of the stub 170 is provided with axially extending splines 172. As best shown in FIG. 4 (and also in FIG. 5), the stub 170 defines an opening 174 through which can extend the drive shaft (not shown) of the vehicle 10. Understandably, the configuration of the stub 170 must match the configuration of the stub on the original knuckle replaced by the knuckle 100. In that sense, other embodiments of steering knuckles in accordance with the principles of the present invention could be provided without stub 170 if the original knuckle does not have a stub or if the driving system of the vehicle 10 does not require a stub.

Referring to FIG. 5, the inner side 120 of the steering knuckle is configured to accommodate the ball joints of the suspension and steering assembly 12 of the vehicle 10. In that sense, the inner side 120 comprises upper recess 122 and lower recess 124. Upper recess 122 is configured for accommodating the ball joint (not shown) located at the end of the upper control arm 16 of the suspension and steering assembly 12. Upper recess 122 also comprises an opening 152 extending to the upper region 150 (see also FIG. 8). Opening 152 is configured to receive the rod (not shown) supporting the upper ball joint (not shown). Similarly, lower recess 124 is configured for accommodating the ball joint (not shown) located at the end of the lower control arm 18 of the suspension and steering assembly 12. Lower recess 124 also comprises an opening 162 extending to the lower region 160 (see also FIG. 9). Opening 162 is configured to receive the rod (not shown) supporting the lower ball joint (not shown).

The inner side 120 also comprises an outwardly extending lug 126, having an opening 127 therethrough, for receiving the end of the steering arm 20 of the suspension and steering assembly 12.

Understandably, as the configuration of the suspension and steering assembly 12 differs on different vehicles, the inner side 120 is typically designed or customized to fit one or more specific vehicles (or vehicle configurations). Other embodiments of steering knuckles in accordance with the principles of the present invention could therefore have different inner side configurations to fit different configurations of suspension and steering assemblies. Hence, when the steering knuckle is used as a replacement, the inner side of the steering knuckle will typically substantially replicate the inner side of the steering knuckle it is configured to replace.

Referring now more particularly to FIGS. 2, 6, 7 and 9, in the first embodiment, the knuckle 100 comprises three attachment areas 135, 145 and 165. In the present embodiment, the attachment areas 135, 145 and 165 are respectively located on the front region 130, the rear region 140, and the bottom region 160.

Understandably, in other embodiments, there could be more, or less, attachment areas, and the attachment areas could be located elsewhere on the steering knuckle. For instance, in some embodiments, there could be an attachment area on the top region 150. Also, in some embodiments, an attachment area could extend over more than one regions (e.g. over the front and bottom regions, over the rear and bottom regions, etc.). In addition, in some embodiments, an attachment area could be located at the junction of two regions. Further still, in some embodiments, most, if not all, the peripheral surface could comprise attachment areas such as to allow the attachment elements to fully circumscribe the knuckle.

As can be seen from the figures, in the first embodiment, the attachment areas 135, 145 and 165 are generally flat such as to easily accommodate attachment elements or brackets 330, 340 and 360 (see FIGS. 2 and 3) having flat mating surfaces 332, 342 and 362 respectively. Still, in other embodiments, the attachment areas could be other than flat. For instance, the attachment areas 135, 145 and 165 and the mating surfaces 332, 342 and 362 of the attachment elements 330, 340 and 360 could have complementary configurations (e.g. male/female configurations, complementary toothed configurations, mortise and tenon configurations, etc.). Also, in the first embodiment, the attachment areas 135, 145 and 165 are respectively provided with fastener-receiving openings or bores 136/137, 146/147 and 166. In the first embodiment, these bores are threaded bolt-receiving bores. Understandably, in other embodiments, other fasteners or attachment mechanisms could be used to secure the attachment elements to the attachment areas (e.g. dowels, pins, keys, clamps, etc.).

As best shown in FIG. 2, by having these predetermined attachment areas 135, 145 and 165, the front region 130, the rear region 140 and the bottom region 160 provide predetermined locations on the steering knuckle 100 where a track system 300 (shown exploded in FIG. 2) can easily yet rigidly be secured.

In that sense, in the first embodiment, to mount the track system 300 to the steering knuckle 100, the track system 300 only needs attachment elements 330, 340 and 360. These attachment elements 330, 340 and 360 have bolt holes patterns which respectively match the bore patterns of the attachments areas 135, 145 and 165 such that they can easily be secured to the attachment areas 135, 145 and 165 of the steering knuckle 100 using bolts (see FIG. 2).

Figure 3:
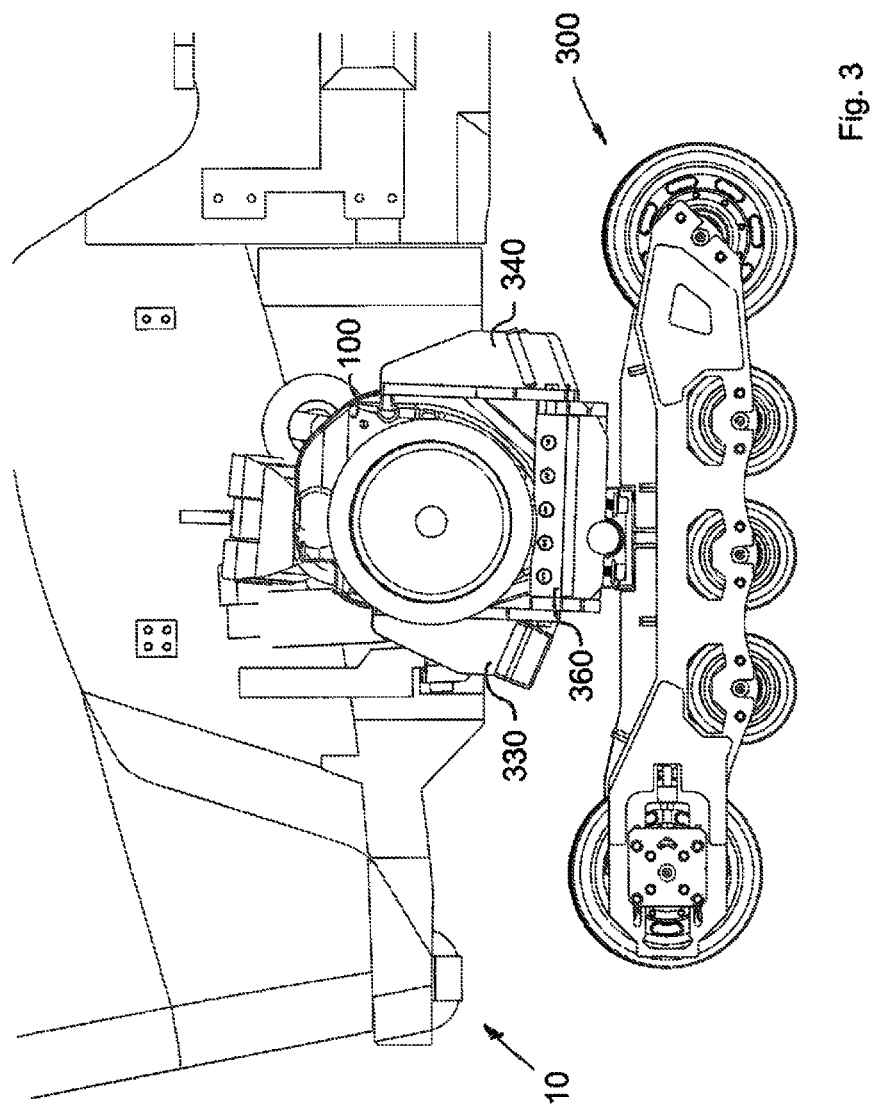
FIG. 3 is a fragmentary left side view of the farming traction of FIG. 1, further comprising a track system, without the endless traction band, attached to the knuckle.

To provide additional rigidity, the attachment elements 330, 340, 360 may further be configured to be fastened together as shown in FIGS. 2 and 3. Still, in other embodiments, the attachment elements 330, 340, 360 could be unitary and form a single attachment element.

Understandably, by having these predetermined attachment areas 135, 145 and 165, the steering knuckle 100 allows the installation of a wheel-replacing track system 300 more easily and more solidly. Indeed, the predetermined attachment areas 135, 145 and 165 provide predetermined locations on the steering knuckle 100 to secure the attachment elements 330, 340 and 360 needed to secure the track system 300 to the vehicle 10. By providing these predetermined locations, the present steering knuckle 100 avoids the need to secure the track system 300 at inconvenient or weak locations on the vehicle 10.

As an additional benefit, the predetermined attachment areas 135, 145 and 165 on the steering knuckle 100 allows the wheel-replacing track system 300 to be more properly aligned with respect to the vehicle 10.

In addition, since the steering knuckle 100 is configured to support the track system 300, the steering knuckle 100 is typically reinforced (e.g. made bigger and/or thicker), more particularly near or around the regions where the attachment areas 135, 145 and 165 are located. Other regions of the steering knuckle 100 could also be reinforced if necessary. The additional material allows the steering knuckle 100 to support and sustain the additional load transmitted to the steering knuckle 100 by the track system 300. Also, in some embodiments, the additional material allows the standardization of the locations of the attachment areas.

Still, the steering knuckle 100 is preferably configured to remain on the vehicle 10 as a regular knuckle when the track system 300 is removed and replaced by a regular wheel. In that sense, the steering knuckle 100 is preferably configured not to interfere with the proper functioning and steering of the wheel of the vehicle 10 when wheels are used.

Referring now to FIGS. 10 to 16, a second embodiment of a steering knuckle 600 in accordance with the principles of the present invention is illustrated.

Figure 10:
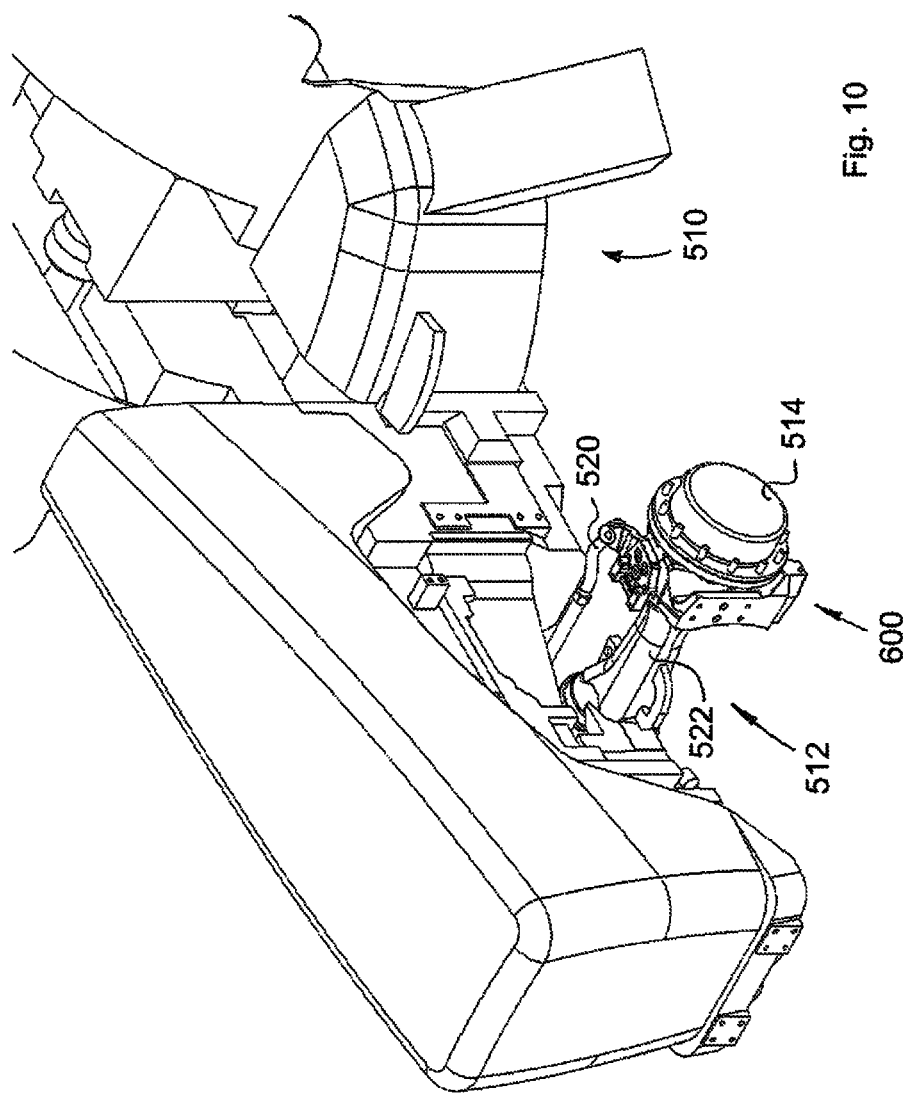
FIG. 10 is a fragmentary left side perspective view of a farming tractor equipped with another embodiment of a steering knuckle in accordance with the principles of the present invention.

Referring first to FIG. 10, the steering knuckle 600 is illustrated as normally installed to the front left steering assembly 512 of a vehicle 510. Notably, while in FIG. 1, the steering knuckle 100 was mounted to steering and suspension assembly 12, in FIG. 10, the vehicle 510 has a rigid axle 522 without suspension assembly and thus, the steering knuckle 600 is only mounted to the rigid axle 522 and the steering assembly 512.

As in FIG. 1, in FIG. 10, the vehicle 510 is a common farming tractor. Still, the steering knuckle 600 could be used on other vehicles having a similar steering configuration.

In the second embodiment, the steering knuckle 600 is typically coupled to the rigid axle 522 via a kingpin arrangement. It remains that the steering knuckle 600 is also configured to receive the drive shaft (not shown) of the vehicle 510 and to support the planetary gear assembly which drives the wheel hub 514 to which the wheel (not shown) of the vehicle 510 is normally mounted.

Though not shown, a right steering knuckle 600, which is substantially a mirror image of the left steering knuckle 600 shown in FIG. 10, is also installed on the right side of the vehicle 510. Since both the left side and the right side knuckles 600 are substantially identical, aside from being mirror images of each other, only the left side knuckle 600 will be described below.

Referring now to FIGS. 11 to 16, the steering knuckle 600 generally comprises an outer side 610, an inner side 620, and an overall periphery or peripheral surface 605. The peripheral surface 605 broadly comprises a front region 630, a rear region 640, a top region 650 and a bottom region 660.

Figure 11:
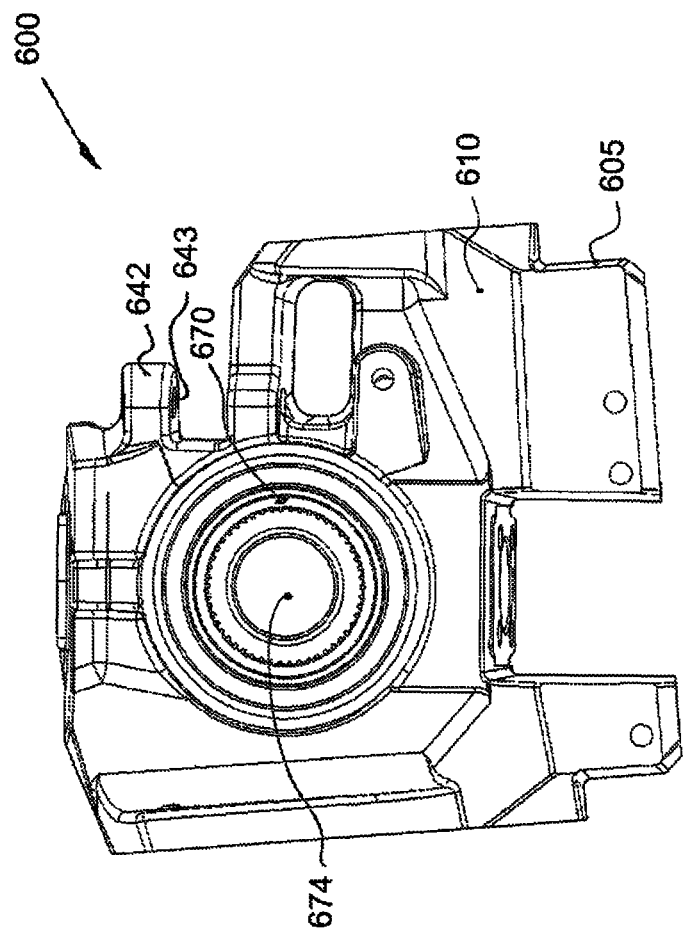
FIG. 11 is an exterior view of the steering knuckle of FIG. 10.
Figure 12:
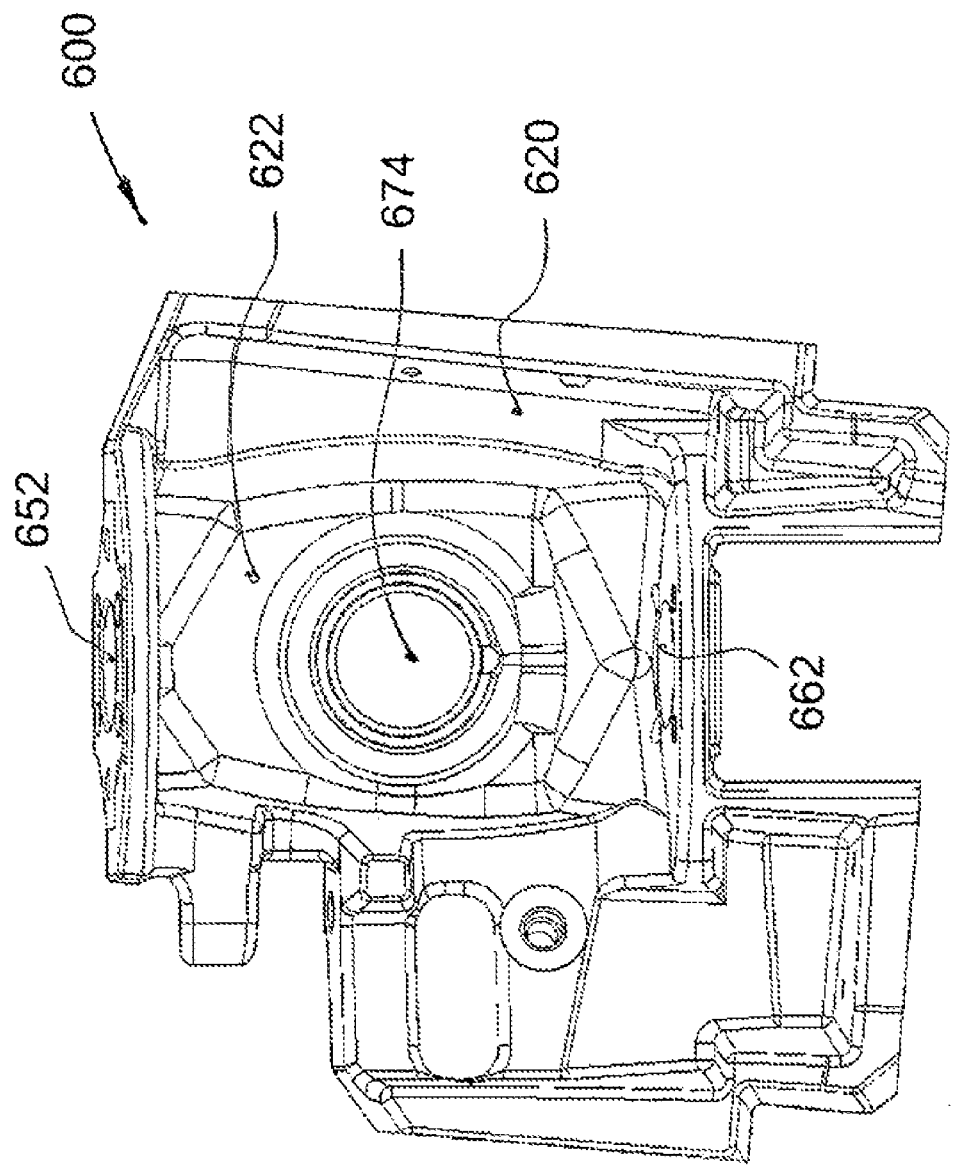
FIG. 12 is an interior view of the steering knuckle of FIG. 10.

Notably, as can be seen in FIGS. 11 and 12, the peripheral surface 605 of the steering knuckle 600 is clearly not regular and its exact shape can vary widely according to the vehicle or vehicles for which the steering knuckle 600 is designed for. Hence, the term front, top, rear and bottom used with respect to the regions of the peripheral surface 605 of the steering knuckle 600 must not be construed with geometric exactness.

Figure 13:
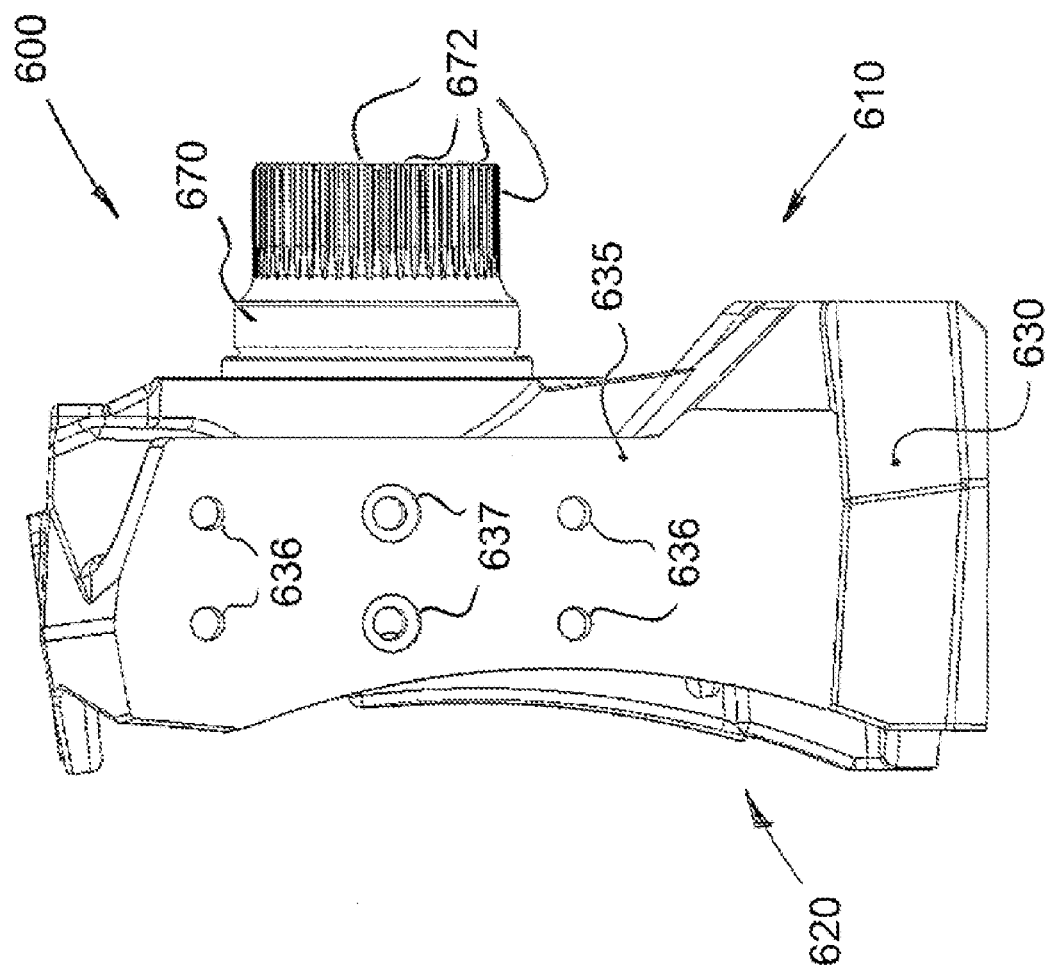
FIG. 13 is a front view of the steering knuckle of FIG. 10.

As can be seen in FIGS. 11 and 13, the steering knuckle 600 also comprises a stub 670 outwardly extending from the outer side 610. The stub 670 is configured to support the planetary gear assembly which drives the wheel hub 514 best shown in FIG. 10. To provide proper support between the planetary gear assembly and the stub 670, the circumference of the stub 670 is provided with axially extending splines 672. As best shown in FIG. 11 (and also in FIG. 12), the stub 670 defines an opening 674 through which can extend the drive shaft (not shown) of the vehicle 510. Understandably, the configuration of the stub 670 must match the configuration of the stub on the original knuckle replaced by the knuckle 600. In that sense, other embodiments of steering knuckles in accordance with the principles of the present invention could be provided without stub 670 if the original knuckle does not have a stub or if the driving system of the vehicle 510 does not require a stub.

Referring to FIG. 12, the inner side 620 of the steering knuckle is configured to accommodate the kingpin (also referred to as "pivot axle") assembly of the rigid axle 522 of the vehicle 510. In that sense, the inner side 620 comprises main recess 622. Main recess 622 is configured for accommodating the extremity of the axle 522 and the kingpin assembly. Main recess 622 also comprises an upper opening 652 extending to the upper region 650 (see also FIG. 15) and a lower opening 662 extending to the lower region 660 (see also FIG. 16). Upper opening 652 is configured to receive the upper kingpin member (not shown) while the lower opening 662 is configured to receive the lower kingpin member (not shown).

Understandably, as the configuration of the steering assembly 512 differs on different vehicles, the inner side 620 is typically designed or customized to fit on one or more specific vehicles (or vehicle configurations). Other embodiments of steering knuckles in accordance with the principles of the present invention could therefore have different inner side configurations to fit different configurations of axle and steering assemblies. Hence, when the steering knuckle is used as a replacement, the inner side of the steering knuckle will typically substantially replicate the inner side of the steering knuckle it is configured to replace.

Figure 14:
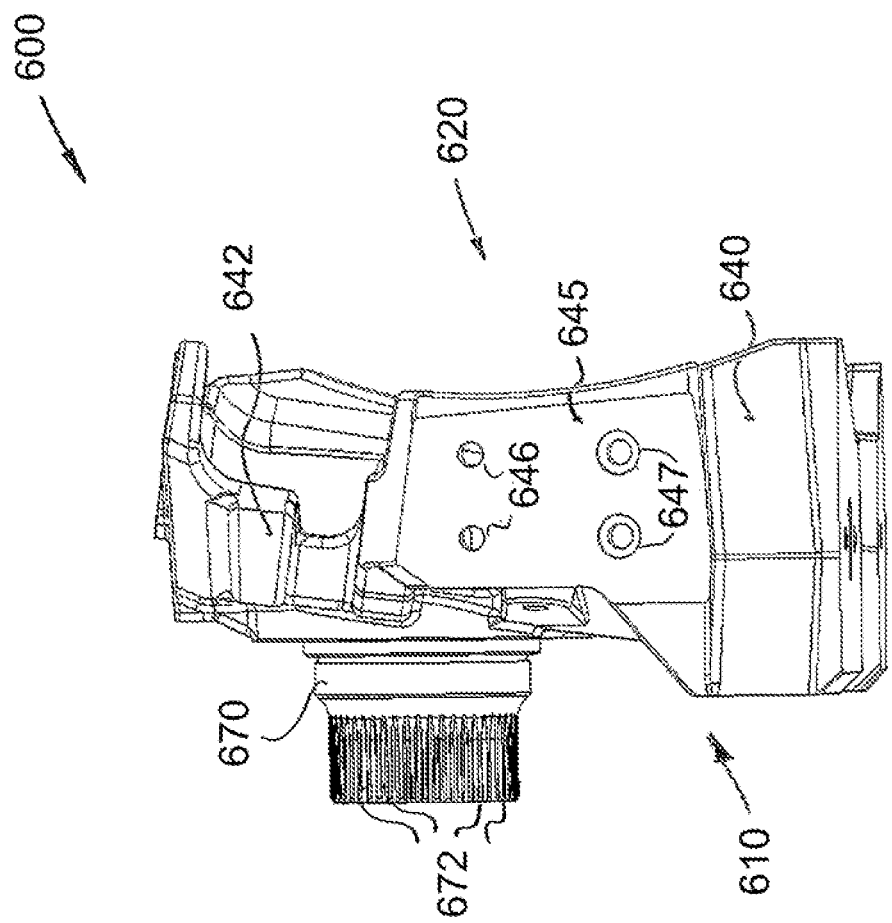
FIG. 14 is a rear view of the steering knuckle of FIG. 10.
Figure 15:
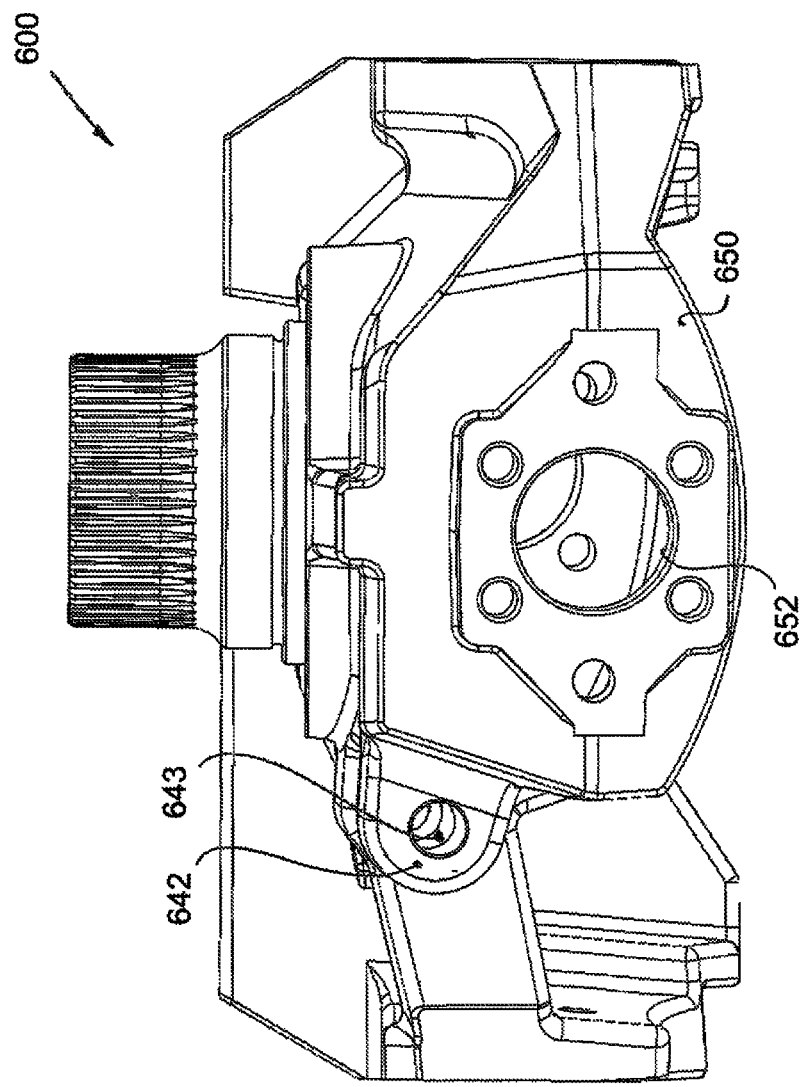
FIG. 15 is a top view of the steering knuckle of FIG. 10.

Referring now to FIGS. 11, 14 and 15, the rear region 640 of the steering knuckle 600 comprises an outwardly extending lug 642, having an opening 643 therethrough, for receiving the end of the steering arm 520 of the steering assembly 512 (see also FIG. 10).

Referring now more particularly to FIGS. 13, 14 and 16, in the second embodiment, the knuckle 600 also comprises three attachment areas 635, 645 and 665. The attachment areas 635, 645 and 665 are respectively located at the front region 630, the rear region 640, and the bottom region 660.

In the second embodiment, the attachment areas 635, 645 and 665 are generally flat such as to easily accommodate the flat mating areas of the attachment elements or brackets used to mounted the track system 300 to the vehicle 510. Understandably, as already mentioned, in other embodiments, the attachment areas and the mating areas of the attachment elements could be other than flat and have substantially complementary configurations. Notably, though attachment areas 635 and 645 are unitary, i.e. a single attachment area, attachment area 665 comprises two distinct areas 665A and 665B in order to provide space for the lower kingpin member.

Attachment areas 635, 645 and 665 are respectively provided with fastener-receiving bores 636/637, 646/647 and 666. In the second embodiment, these bores are threaded bolt-receiving bores. Understandably, as already mentioned, in other embodiments, other fasteners or attachment mechanisms could be used to secure the attachment elements to the attachment areas (e.g. dowels, pins, keys, clamps, etc.).

Understandably, as already mentioned above, in other embodiments, there could be more, or less, attachment areas, and the attachment areas could be located elsewhere on the steering knuckle.

As in the first embodiment, by having these predetermined attachment areas 635, 645 and 665, the second embodiment of steering knuckle 600 allows the installation of a wheel-replacing track system 300 more easily and more solidly as the attachment areas 635, 645 and 665 provide predetermined locations on the steering knuckle 600 to secure the attachment elements needed to secure the track system 300 to the vehicle 510. By providing these predetermined locations, the steering knuckle 600 avoids the need to secure the track system 300 at inconvenient or weak locations on the vehicle 510.

Also, since the steering knuckle 600 is configured to support the track system 300, it is typically reinforced (e.g. made bigger and/or thicker), more particularly near or around the regions where the attachment areas 635, 645 and 665 are located. Other regions could also be reinforced if necessary. The additional material allows the steering knuckle 600 to support and sustain the additional load transmitted thereto by the track system 300. Also, in some embodiments, the additional material allows the standardization of the locations of the attachment areas.

As can be seen from the foregoing description, different configurations of vehicle or vehicles might need different configurations of steering knuckles. Still, a steering knuckle in accordance with the principles of the present invention comprises one or more preconfigured attachment areas, which can be reinforced with additional knuckle material, where attachment element(s) used to secure a track system to a vehicle can be properly secured. As steering knuckles come in a wide variety of shapes, the number, position and configuration of the one or more preconfigured attachment areas on the steering knuckle, or on the periphery thereof, are consequently likely to vary.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A steering knuckle for use with a steering assembly of a vehicle, the knuckle comprising:
   a) an inner side configured to be coupled to a steering assembly to communicate a steering constraint to a track system attached thereto;
   b) an opening configured to receive a power driving mechanism; and
   c) a periphery comprising several attachment areas, each of the attachment areas being configured to mate with an attachment element, the attachment elements being configured to secure the track system to the attachment areas;
      wherein the periphery comprises a front region and a rear region;
      wherein the front region faces the front of the vehicle;

wherein the rear region faces the rear of the vehicle; and wherein at least one of the front and rear regions comprises at least one attachment area.

2. A steering knuckle as claimed in claim 1, wherein each of the attachment areas is substantially flat.

3. A steering knuckle as claimed in claim 1, wherein each of the attachment areas is substantially complementary to a mating surface of the attachment element.

4. A steering knuckle as claimed in claim 1, wherein each of the attachment areas is configured so that the attachment element can be fastened thereto.

5. A steering knuckle as claimed in claim 1, wherein each of the attachment areas comprises fastener-receiving openings.

6. A steering knuckle as claimed in claim 5, wherein the fastener-receiving openings are threaded.

7. A steering knuckle as claimed in claim 1, wherein the periphery comprises, a top region and a bottom region, and wherein the front, rear and bottom regions comprise at least some of the attachment areas.

8. A steering knuckle as claimed in claim 1, wherein the attachment elements are unitary.

9. A steering knuckle as claimed in claim 1, wherein the attachment areas are reinforced.

10. A vehicle comprising left and right steering assemblies, the vehicle comprising a pair of steering knuckles as claimed in claim 1 respectively mounted to the left and right steering assemblies.

11. A vehicle as claimed in claim 10, wherein the vehicle is an agricultural vehicle.

12. A vehicle as claimed in claim 10, wherein the vehicle is a tractor.

13. A steering knuckle as claimed in claim 2, wherein each of the attachment areas is configured so that the attachment element can be fastened thereto.

14. A steering knuckle as claimed in claim 13, wherein each of the attachment areas comprises fastener-receiving openings.

15. A steering knuckle as claimed in claim 14, wherein the fastener-receiving openings are threaded.

16. A steering knuckle as claimed in claim 1, wherein the periphery comprises, a top region and a bottom region, and wherein each of the front, rear and bottom regions comprise at least one of the attachment areas.

17. A steering knuckle as claimed in claim 16, wherein each of the attachment areas is substantially flat.

18. A steering knuckle as claimed in claim 17, wherein each of the attachment areas is configured so that the attachment element can be fastened thereto.

19. A steering knuckle as claimed in claim 18, wherein each of the attachment areas comprises fastener-receiving openings.

20. A steering knuckle as claimed in claim 19, wherein the fastener-receiving openings are threaded.

21. A steering knuckle as claimed in claim 1, wherein each of the front, and rear regions comprise at least one of the attachment areas.

* * * * *